United States Patent
Lonoce et al.

(10) Patent No.: US 12,384,253 B2
(45) Date of Patent: Aug. 12, 2025

(54) ELECTRICAL VEHICLE COMPRISING AN ENERGY TRANSFER DEVICE

(71) Applicant: Hitachi Energy Ltd, Zürich (CH)

(72) Inventors: Luigi Lonoce, Zurich (CH); Bruce Warner, Etoy (CH); Michel Lauria, Prilly (CH); Bassem Sudki, Bussigny-près-Lausanne (CH)

(73) Assignee: Hitachi Energy Ltd, Zurich (CH)

( * ) Notice: Subject to any disclaimer, the term of this patent is extended or adjusted under 35 U.S.C. 154(b) by 719 days.

(21) Appl. No.: 17/779,396

(22) PCT Filed: Nov. 9, 2020

(86) PCT No.: PCT/EP2020/081515
§ 371 (c)(1),
(2) Date: May 24, 2022

(87) PCT Pub. No.: WO2021/104842
PCT Pub. Date: Jun. 3, 2021

(65) Prior Publication Data
US 2023/0032876 A1    Feb. 2, 2023

(30) Foreign Application Priority Data
Nov. 28, 2019    (EP) .................................... 19212322

(51) Int. Cl.
  *B60L 5/28*    (2006.01)
  *B60L 5/16*    (2006.01)
  (Continued)

(52) U.S. Cl.
  CPC    *B60L 5/28* (2013.01); *B60L 5/16* (2013.01); *B60L 5/22* (2013.01); *B60L 5/42* (2013.01); *B62D 47/02* (2013.01); *B60L 2200/18* (2013.01)

(58) Field of Classification Search
  CPC ...... B60L 5/16; B60L 5/22; B60L 5/24; B60L 5/26; B60L 5/28; B60L 5/42; B60L 2200/18; B62D 47/02
  See application file for complete search history.

(56) References Cited

U.S. PATENT DOCUMENTS 588,188 A * 8/1897 Shallenberger ........... B60L 5/16
                                                         191/50
4,357,501 A * 11/1982 Clerc ....................... B60L 5/16
                                                         191/83
(Continued)

FOREIGN PATENT DOCUMENTS

CN    104185567 A    12/2014
CN    106004457 A    10/2016
(Continued)

*Primary Examiner* — S. Joseph Morano
*Assistant Examiner* — Cheng Lin
(74) *Attorney, Agent, or Firm* — Slater Matsil, LLP

(57) ABSTRACT

An energy transfer device is configured for electrically connecting an electrical vehicle to a charging station. The energy transfer device includes a lengthwise link having an upper end and lower end and a crosswise link having an upper end and lower end. The lower ends of the lengthwise link and the crosswise link are configured to be arranged on the electrical vehicle slidably in crosswise direction of the electrical vehicle. The upper end of the crosswise link is connected to the lengthwise link between its ends such that, by sliding the lower ends of the lengthwise link and the crosswise link towards each other, the upper end of the lengthwise link will be moved away from the electrical vehicle for connecting to the charging station.

20 Claims, 4 Drawing Sheets

(51) Int. Cl.
*B60L 5/22* (2006.01)
*B60L 5/42* (2006.01)
*B62D 47/02* (2006.01)

(56) References Cited

U.S. PATENT DOCUMENTS

| | | | | |
|---|---|---|---|---|
| 5,124,510 | A * | 6/1992 | Garfinkle | B60L 5/19 |
| | | | | 191/65 |
| 9,539,905 | B2 * | 1/2017 | Wang | B60L 5/18 |
| 9,937,799 | B2 * | 4/2018 | Doddakula | B60L 5/16 |
| 10,807,486 | B1 * | 10/2020 | Torok | B60L 53/16 |
| 2015/0034441 | A1 * | 2/2015 | Nakajima | B60L 50/13 |
| | | | | 191/59.1 |
| 2016/0121734 | A1 * | 5/2016 | Storm | B60L 53/665 |
| | | | | 903/903 |
| 2017/0080813 | A1 * | 3/2017 | Bedell | B60L 5/18 |

FOREIGN PATENT DOCUMENTS

| | | | | |
|---|---|---|---|---|
| CN | 106494236 A | * | 3/2017 | |
| CN | 107176039 A | | 9/2017 | |
| CN | 107933318 A | * | 4/2018 | ............... B60L 5/22 |
| CN | 109263479 A | * | 1/2019 | ............... B60L 5/22 |
| DE | 3041024 A1 | | 6/1982 | |
| DE | 102012213460 A1 | * | 2/2014 | ......... B60L 11/1842 |
| GB | 2185866 A | | 7/1987 | |
| JP | H06113403 A | | 4/1994 | |
| JP | 2004147494 A | * | 5/2004 | |
| JP | 2013118787 A | | 6/2013 | |
| WO | WO-2016201901 A1 | * | 12/2016 | ............... B60L 5/00 |

* cited by examiner

ELECTRICAL VEHICLE COMPRISING AN ENERGY TRANSFER DEVICE

CROSS-REFERENCE TO RELATED APPLICATIONS

This application is a national stage application of International Application No. PCT/EP2020/081515, filed on Nov. 9, 2020, which claims priority to European Patent Application No. 19212322.2, filed on Nov. 28, 2019, which applications are hereby incorporated herein by reference.

TECHNICAL FIELD

The invention relates to an electrical vehicle comprising an energy transfer device.

BACKGROUND

Electric vehicles are becoming increasingly practical, and electric buses in particular are beginning to be used on public service routes in cities throughout the world. Compared with traditional diesel-powered buses, electric buses have advantages in terms of reduced air pollution and quieter operation.

Electric buses often fall into two types. 'Big battery' buses have large-capacity batteries, which are charged for a number of hours, for example overnight, to provide enough range for a reasonably long journey. 'Fast-charging' buses, on the other hand, often have lower-capacity batteries which are designed to be charged very rapidly, for example at passenger stops, to provide enough range until the next charging point. The smaller batteries mean reduced overall weight of the vehicle and therefore more passenger capacity and more efficient operation.

The fast-charging design is particularly suitable for public-service city buses, where the route may be even 10 kilometers long. Buses can be charged at one end of the route, to provide enough range to run the service to the other end of the route and then back again to be recharged, or at selected bus stop. Charging takes a relatively short period of time, and can take place for example during a driver changeover period or during bus stop at some bus stop.

Charging stations for charging busses often comprise a vertically extending structure with a horizontally charging mount, under which the electrical bus stops. A current collector often provided as pantographs and usually attached to a roof of the electrical bus extracts for thereby electrically connecting with electrical contacts of the charging mount such that charging can start.

Constraint in terms of electrical bus passenger capacity is the bus axle load, given that today's batteries for powering electrical busses are already heavy in weight. Thus, reducing actual mass of all on-board equipment and in particular of any equipment related to providing electrical energy of such electrical busses is a key requirement.

SUMMARY

Embodiments of the invention relate to an electrical vehicle comprising an energy transfer device configured for electrically connecting the electrical vehicle to a charging station, whereby the energy transfer device comprises a lengthwise link.

Embodiments of the invention can provide an electrical vehicle and, in particular, an electrical bus that comprises a lighter means in weight for electrically connecting to a charging station.

A first embodiment provides an energy transfer device that is configured for electrically connecting an electrical vehicle to a charging station. The energy transfer device comprises a lengthwise link having an upper end and lower end and a crosswise link having an upper end and lower end. The lower end of the lengthwise link and the lower end of the crosswise link are configured to be arranged on the electrical vehicle slidably in crosswise direction of the electrical vehicle. The upper end of the crosswise link is connected to the lengthwise link between its upper and lower ends such that by sliding the lower end of the lengthwise link and the lower end of the crosswise link toward each other, the upper end of the lengthwise link will be moved away from the electrical vehicle.

Another embodiment provides an electrical vehicle that comprises a vehicle body that includes a roof, a plurality of rails coupled to the roof, a lengthwise link and a crosswise link. A lengthwise bottom plate and a crosswise bottom plate are slidably attached to the rails. The lengthwise bottom plate is attached to the lower end of the lengthwise link and the crosswise bottom plate is attached to the lower end of the crosswise link. The upper end of the crosswise link is connected to the lengthwise link between its upper and lower ends such that by sliding the lower end of the lengthwise link and the lower end of the crosswise link toward each other, the upper end of the lengthwise link will be moved away from the roof. An electrical connector element is attached to the upper end of the lengthwise link.

Yet another embodiment provides a method for connecting an energy transfer device to a charging station. The energy transfer device comprises a lengthwise link having a lower end slidably attached to an electrical vehicle and a crosswise link having a lower end slidably attached to the electrical vehicle and an upper end crosswise link is connected to the lengthwise link between the lower end and an upper end. The method comprises sliding the lower end of the lengthwise link and the lower end of the crosswise link toward each other such that the upper end of the lengthwise link is moved away from the electrical vehicle, and connecting an electrical connector element arranged at the upper end of the lengthwise link to the charging station.

BRIEF DESCRIPTION OF THE DRAWINGS

These and other aspects of the invention will be apparent from and elucidated with reference to the embodiments described hereinafter.

In the drawings.

DETAILED DESCRIPTION OF ILLUSTRATIVE EMBODIMENTS

Figure 1:
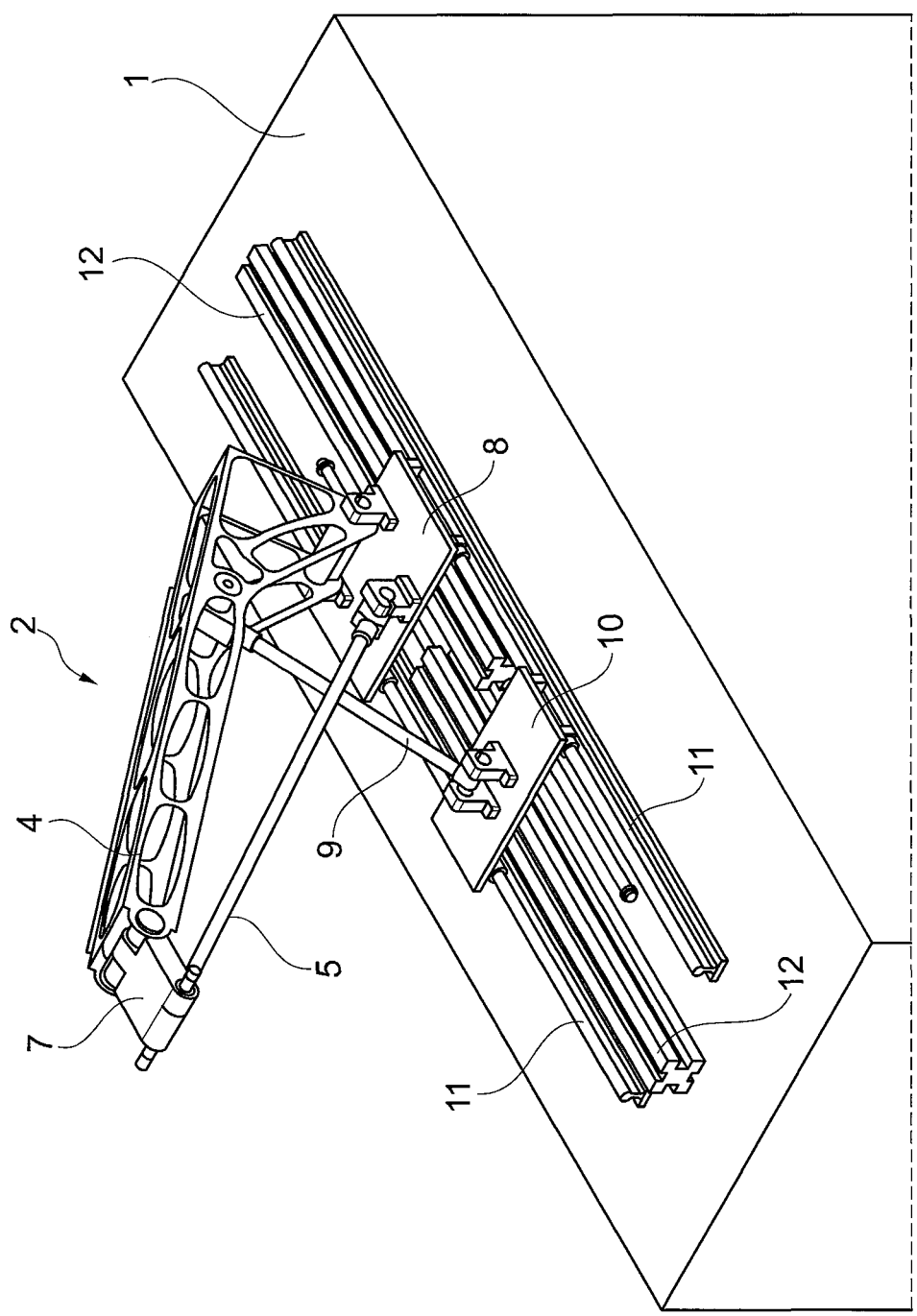
FIG. 1 shows a partial view of an electrical vehicle comprising an energy transfer device in a perspective schematic view according to a preferred embodiment.
Figure 2:
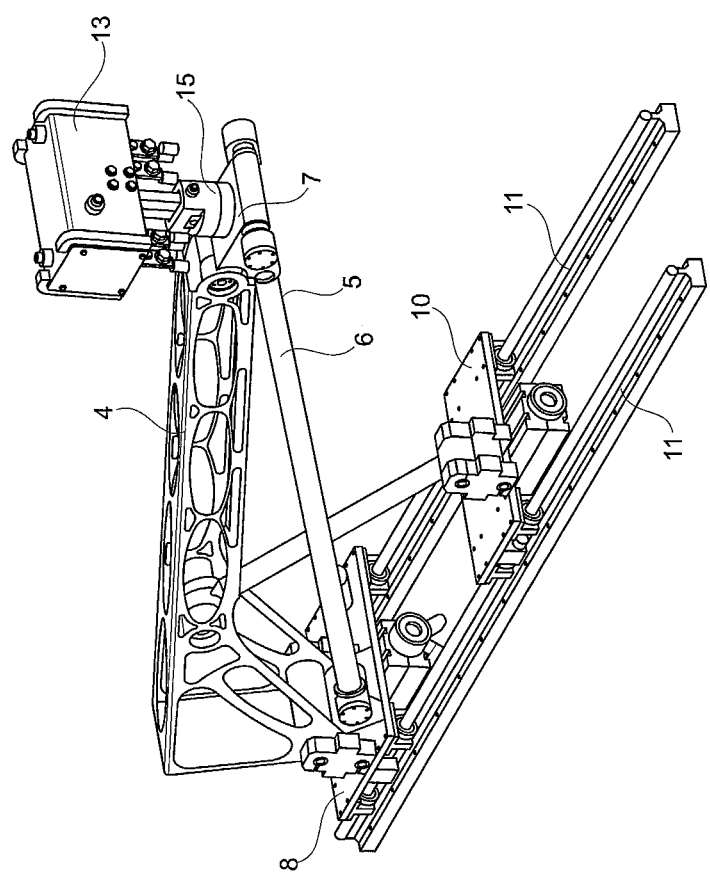
FIG. 2 shows the energy transfer device of FIG. 1 in a further perspective schematic view according to the preferred embodiment.
Figure 3:
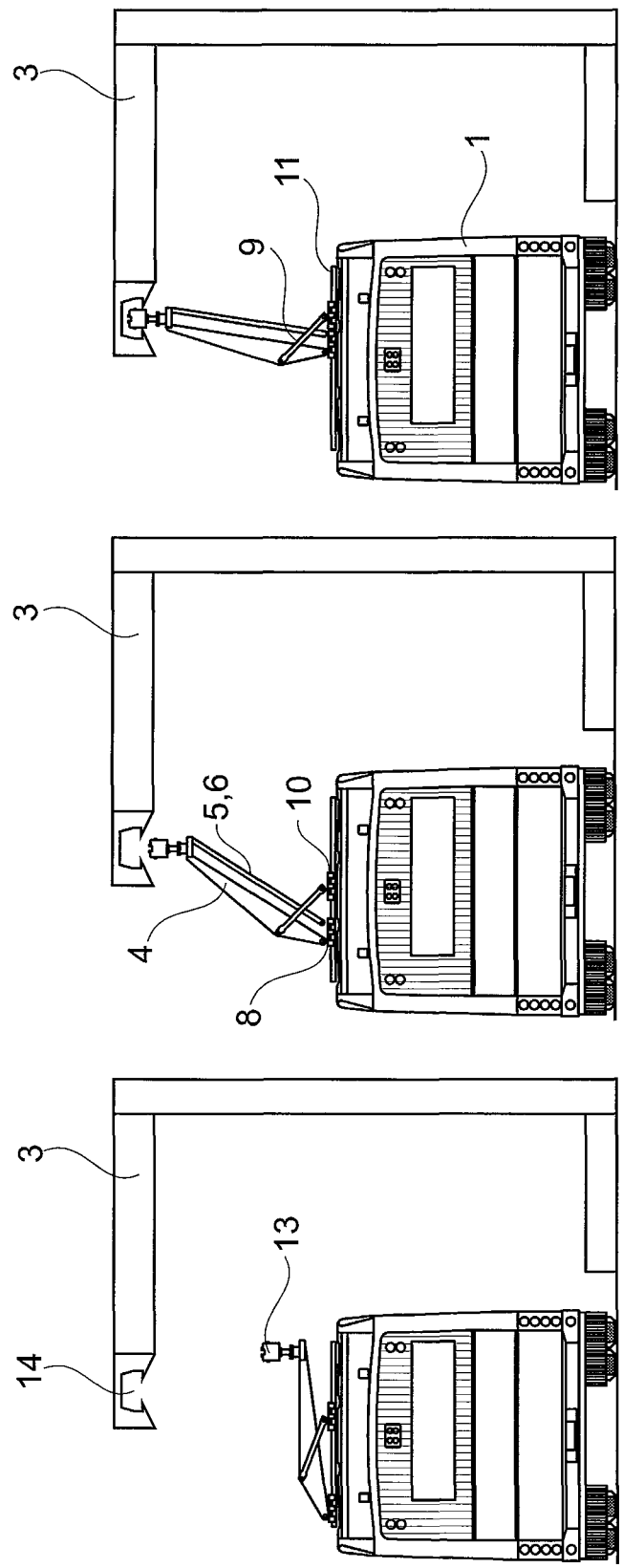
FIG. 3 shows electrical vehicle comprising the energy transfer device of FIG. 1 connecting to a charging station in three different situations in a side view according to the preferred embodiment.
Figure 4:
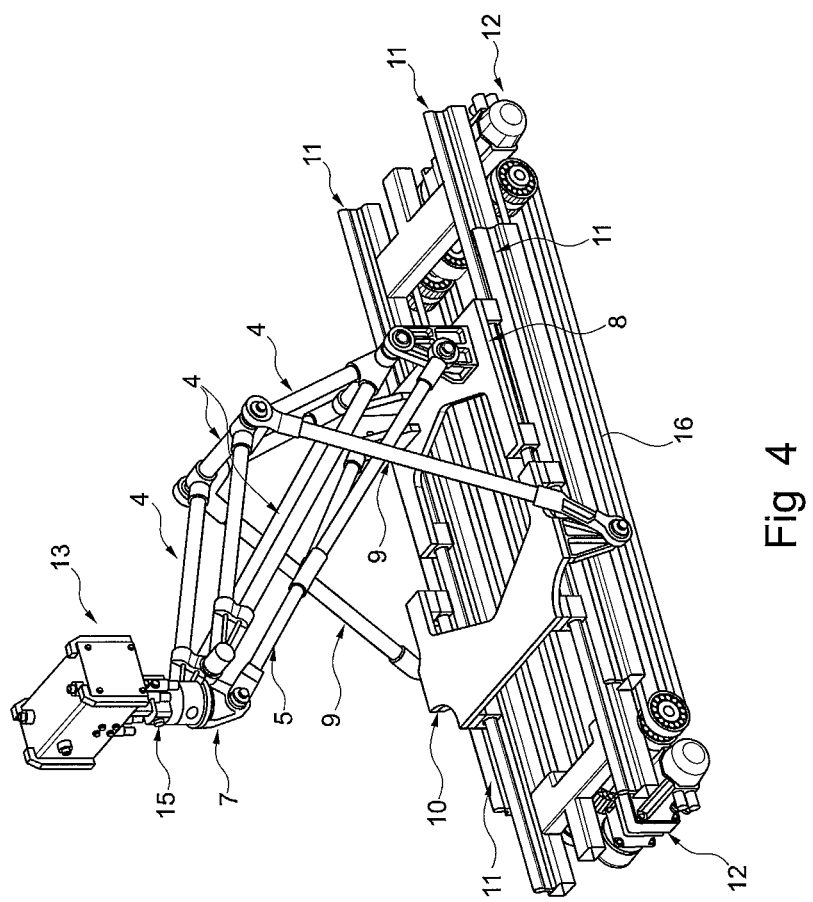
FIG. 4 shows the energy transfer device in a perspective schematic view according to a further preferred embodiment.

FIG. 1 shows a partial view of an electrical vehicle 1 provided as an electrical bus and comprising an energy transfer device 2 electrically connecting the electrical vehicle to a charging station 3, depicted in FIG. 3, in a perspective schematic view according to a preferred embodiment. FIG. 2 shows the energy transfer device 2 of FIG. 1 in a further perspective schematic view according to the preferred embodiment. FIG. 4 shows the energy transfer device 2 in a further perspective schematic view according to a further preferred embodiment.

In one embodiment, an electrical vehicle 2 comprises an energy transfer device 2 configured for electrically connecting the electrical vehicle 2 to a charging station 3. The energy transfer device 2 comprises a lengthwise link 4 and a crosswise link 9 each having an upper end and lower end. The lower ends are arranged on the electrical vehicle 2 slidably in crosswise direction of the electrical vehicle 2. The upper end of the crosswise link 9 is connected to the lengthwise link 4 between its ends such that by sliding the lower ends of the lengthwise link 4 and the crosswise link 9 towards each other the upper end of the lengthwise link 4 is moved away from the electrical vehicle 2 preferably in a vertical direction for connecting to the charging station 3.

A key point of this embodiment is therefore to provide a 'lambda parallel mechanism' comprising the lengthwise link 4 and the crosswise link 9 connected together in the form of a 'lambda'. By means of the proposed 'lambda parallel mechanism' an electrical connection can be easily established with the charging station 3 in less than one second for allowing flash-charging the electrical vehicle 2 for example at a passenger bus stop. The proposed solution is based on a mechanical deployment in the vertical and horizontal plane, thereby achieving a substantial reduction in weight compared to prior art solutions for establishing such electrical connections.

In a typical scenario the electrical vehicle 2, which is preferably provided as an electrical bus, stops underneath a charging station connector element 14 of a charging station 3, such as a horizontally extending charging mount comprising the charging station connector element 14 as electrical contacts. The lower ends of the lengthwise link 4 and the crosswise link 9 are slid towards each thereby extracting the upper ends away from the electrical vehicle 2 towards the charging station connector element 14 and eventually electrically connecting with the charging station connector element 14 such that charging of the electrical vehicle 2 may start. In order to horizontally adjust with the charging station 3, prior to electrically connecting with the charging station connector element 14 the lower ends of the lengthwise link 4 and the crosswise link 9 can be slid in the same direction such that thereby the lengthwise link 4 and the crosswise link 9 are moved in crosswise direction of the electrical vehicle 2. Once the electrical bus is fully charged, for example by a charging station 3 installed at an end of a route of the electrical bus, or if the electrical bus wants to proceed with its route, the lower ends of the lengthwise link 4 and the crosswise link 9 are slid away from each other thereby distracting the upper ends away from the charging station 3 and moving the lengthwise link 4 and the crosswise link 9 towards the electrical vehicle 2.

The energy transfer device 2 is preferably arranged on a roof of the electrical vehicle 2. Thereby, the lengthwise link 4, the crosswise link 9 and/or the sliding movement direction extend respectively is preferably orthogonal to a longitudinal direction of the electrical vehicle 2 and/or to a driving direction of the electrical vehicle 2. The crosswise link 9 preferably comprises a shorter length than the lengthwise link 4 and/or the lengthwise link 4 and the crosswise link 9 are connected, in side view in longitudinal direction of the electrical vehicle 2, as said 'lambda'. Thereby, the ratio between the length between the upper end of the lengthwise link 4 and the connection of the crosswise link 9 to the lengthwise link 4 in respect to the extension of the lengthwise link 4 is preferably 1:1, 1:2, 1:3 or 1:4. The lower ends are preferably arranged such that the ends can slide across the full crosswise direction of the electrical vehicle 2.

The charging station 3 may comprise a substantially upright structure with a substantially horizontal charging mount as overhead section installed at a bus stop. The charging station 3 is preferably connected to and/or is part of an EVSE, electrical vehicle 2 charging equipment, an element in an infrastructure that supplies electric energy for the recharging of electric vehicles, such as plug-in electric vehicles, including electric cars, neighborhood electric vehicles and plug-in hybrids. The charging station 3 is preferably configured for allowing so called fast-charging according to standards Type 2, CCS, CHAdeMO, SAE Combined Charging System, Tesla Superchargers and/or EVSE which are a simple voltage source as a control pilot for post-insertion signaling is on-board the electrical vehicle 2. The charging station 3 may charge the electrical vehicle 2 with a nominal AC and/or DC voltage such as for example up to 3000 V.

According to a preferred implementation the electrical vehicle 2 comprises a second lengthwise link 5 arranged in parallel and distant to the lengthwise link 4. The second lengthwise link 5 is preferably arranged in a manner that it forms an articulated parallelogram with the lengthwise link 4. According to a further preferred implementation the energy transfer device 2 comprises a third lengthwise link 6 arranged in parallel and distant to the lengthwise link 4 and to the second lengthwise link 5, whereby the crosswise link 9 is arranged in-between the second lengthwise link 5 and the third lengthwise link 6. Providing the second lengthwise link 5 and/or the third lengthwise link 6 leads to a more stable energy transfer device 2.

According to another preferred implementation the lengthwise link 4, the second lengthwise link 5, the third lengthwise link 6 and/or the crosswise link 9 are provided as metal rod and/or tube and/or as metal structure, in particular as a folded metal structure. Preferably the lengthwise link 4 is provided as metal structure, whereas the second lengthwise link 5, the third lengthwise link 6 and the crosswise link 9 are provided as metal rods. The second lengthwise link 5 and the third lengthwise link 6 are preferably arranged distant to each in respect to the longitudinal direction of the electrical vehicle 2. The lengthwise link 4 preferably comprises in side view in the longitudinal direction of the electrical vehicle 2 an "L"-like shape, whereby the smaller portion forms the lower end and the longer portion forms the upper end. Such way the upper end of the crosswise link 9 can be provided in a recessed position in respect to a direct, straight connection between the upper end and the lower end of the lengthwise link 4.

According to another preferred implementation the energy transfer device 2 comprises a head plate attached to the upper end of the lengthwise link 4, a lengthwise bottom plate 7 attached to the lower end of the lengthwise link 4 and slidably arranged on the electrical vehicle 2 and and/or a crosswise bottom plate 10 attached to the lower end of the crosswise link 9 and slidably arranged on the electrical vehicle 2. Preferably, the head plate is swiveling attached to the upper end of the lengthwise link 4, the lengthwise bottom plate 7 is swiveling attached to the lower end of the lengthwise link 4 and/or the crosswise bottom plate 10 is swiveling attached to the lower end of the crosswise link 9.

Further preferably, the second lengthwise link 5 and/or third lengthwise link 6 is attached to the head plate and/or to the lengthwise bottom plate 7 at one side, whereby the lengthwise link 4 is respectively attached to the other side. More preferably, the second lengthwise link 5 is attached towards to front side and the third lengthwise link 6 is attached towards the back side of the electrical vehicle 2 to the head plate and/or to the lengthwise bottom plate 7. The lengthwise links preferably comprise the same lengths between their ends such that, if the lengthwise links are swiveled in respect to the head plate and/or to the lengthwise bottom plate 7, the head plate and to the lengthwise bottom plate 7 remain parallel to each other. The second lengthwise link 5 is preferably arranged in a manner that it forms an articulated parallelogram with the lengthwise link 4, with the lengthwise top plate 7 attached to the upper end of the lengthwise link 4 and the lengthwise bottom plate 7 attached to the lower end of the lengthwise link 4.

According to a further preferred implementation the head plate is attached to the upper end of the lengthwise link 4, the lengthwise bottom plate 7 is attached to the lower end of the lengthwise link 4, the crosswise bottom plate 10 is attached to the lower end of the crosswise link 9, and/or the upper end of the crosswise link 9 is attached to the lengthwise link 4 by a passive joint, in particular by a set of rotatable joints. Using such passive points for the respective connections allow an easy and light-weight implementation of the proposed device.

According to another preferred implementation the energy transfer device 2 comprises the lengthwise bottom plate 7 and/or the crosswise bottom plate 10, whereby the lengthwise bottom plate 7 and/or crosswise bottom plate 10 are arranged on rails 11 mounted on the electrical vehicle 2 in crosswise direction of the electrical vehicle 2. The rails 11 preferably extend across the whole crosswise direction of the electrical vehicle 2. The lengthwise bottom plate 7 and/or crosswise bottom plate 10 may comprise rollers for sliding on the rails 11. Preferably the rails 11 are arranged distant to each other and/or the lengthwise bottom plate 7 and/or crosswise bottom plate 10 are slidably but non-detachable attached to the rails 11. Such way the proposed solution allows two degrees of freedom by using the lengthwise bottom plate 7 and/or the crosswise bottom plate 10 as sliders for positioning of the energy transfer device 2 in a vertical plane and in a horizontal plane for connecting with the charging station 3. The proposed combination of lengthwise link 4 and crosswise link 9 provides an advantageous better repartition of structural forces.

According to a further preferred implementation the energy transfer device 2 comprises a pneumatic cylinder and/or a motor 12 for sliding the lengthwise and crosswise bottom plates 8 and 10. Preferably each one pneumatic cylinder and/or motor 12 is attached to one lower end of the lengthwise link 4 and the crosswise link 9 and/or to the bottom plate and the crosswise bottom plate 10. The motion or force control can be controlled with specific profile in both horizontal and vertical direction based on pressure regulation of said pneumatic cylinders and position sensor feedback of the sliders. Such combination of active joints, i.e., pneumatic cylinder and/or motor 12 and passive joints provides a better repartition of structural forces compared to prior art systems. In other words, the proposed solution provides significantly reduced vertical impacts on charging pole during connection thereby resulting in less noise and wear of the overall proposed mechanical structure for connecting to the charging station 3.

According to a further preferred implementation the energy transfer device 2 comprises an electrical connector element 13 attached to the upper end of the lengthwise link 4 and configured for electrically connecting in particular through the lengthwise top plate 7 to the charging station 3. By means of such electrical connector element 13 an electrical connection can be easily established with the charging station 3. The electrical connector element 13 may comprise connectors and/or pins for neutral (N) and line (L1) for single-phase AC, neutral (N) and line phases (L1, L2, and L3) for three-phase AC, neutral (N) and line (L1), negative (−), and positive (+) for combined single-phase AC and low-current DC, negative (−) and positive (+) for low-current DC and/or multiple negative (−, −) and multiple positive (+, +) for mid or high-current DC lines. Besides that the electrical connector element 13 may comprise for signaling connectors and/or pins for proximity pilot (PP) for pre-insertion signaling, for control pilot (CP) for post-insertion signaling and/or protective earth (PE) as full-current protective grounding system.

According to another preferred implementation the electrical connector element 13 is attached to the upper end via a joint 15 allowing rotation of the electrical connector element 13 around a vertical axis. Such way variances between the electrical connector element 13 and the charging station 3 can be eliminated, for example when the electrical vehicle 2 is not exactly parallel positioned to the charging station 3.

According to a further preferred implementation the electrical vehicle 2 is provided as an electrical bus. Alternatively, the electrical vehicle 2 can be provided as a motor car, a bus, a van, a truck, a train, a tractor or any other electrically powered vehicle.

In another embodiment, a method can be used for connecting an energy transfer device 2 of an electrical vehicle 2 to a charging station 3. The lower ends of the lengthwise link 4 and the crosswise link 9 are slid together so that the upper end of the lengthwise link 4 is moved away from the electrical vehicle 2 preferably in a vertical direction thereby connecting to the charging station 3.

According to a preferred implementation the method comprises sliding the lower ends of the lengthwise link 4 and the crosswise link 9 in the same direction such that the lengthwise link 4 and the crosswise link 9 are moved in crosswise direction of the electrical vehicle 2.

In such a way the charging station 3 can be easily and quickly connected within less than one second thereby allowing flash-charging at a passenger bus stop. By sliding the lower ends of the lengthwise link 4 and the crosswise link 9 first in the same direction the energy transfer device 2 can be horizontally positioned in respect to the charging station 3. Once horizontally positioned, the lower ends of the lengthwise link 4 and the crosswise link 9 can be slid together for moving up the upper end of the lengthwise link 4 towards the charging station 3 and eventually connecting with the charging station 3. Alternatively, the lower ends of the lengthwise link 4 and the crosswise link 9 can be moved at the same time in the same direction and together in respect to each other thereby combining a horizontal and vertical movement of the upper end of the lengthwise link 4. For disconnecting the upper end of the lengthwise link 4 from the charging station 3 the method may comprise the step of sliding the lower ends of the lengthwise link 4 and the crosswise link 9 away from each other such that the lengthwise link 4 and the crosswise link 9 are moved in crosswise direction of the electrical vehicle 2 and towards the electrical vehicle 2.

Further embodiments and advantages of the method can be directly and unambiguously derived by one of ordinary skill in the art from the electrical vehicle and device as described herein.

Referring to the drawings in more detail, the energy transfer device 2 comprises a (first) lengthwise link 4, provided as a lengthwise extending metal structure, a second lengthwise link 5 and a third lengthwise link 6, only shown in FIG. 2, while in FIG. 1 only a second lengthwise link 5 is provided, whereby the latter one respectively two lengthwise links 5, 6 are each provided as massive lengthwise extending metal rods. The energy transfer device 2 further comprises a flat square-like lengthwise head plate 7 and a flat square-like lengthwise bottom plate 8, to which upper ends respectively lower ends of all lengthwise links 4, 5, 6 are attached by passive joints. Thereby, the respective ends of the lengthwise link 4 are attached to one side of the lengthwise head plate 7 and lengthwise bottom plate 8, respectively, where the respective ends of the second lengthwise link 5 and the third lengthwise link 6 are attached to the other, opposite one side of the lengthwise head plate 7 and lengthwise bottom plate 8, respectively. Such way all lengthwise links 4, 5, 6 extend by around 1.50 m and ran in parallel and distant to each other such that the lengthwise head plate 7 can be swiveled in parallel to the lengthwise bottom plate 8.

The energy transfer device 2 further comprises a crosswise link 9 provided as massive lengthwise extending metal rod and a flat square-like crosswise bottom plate 10. The crosswise link 9 is attached with its lower end by passive joints to the crosswise bottom plate 10, while its upper end is attached and/or to connected to the lengthwise link 4 between its ends by passive joints such that the distance between the upper end of the lengthwise link 4 and the crosswise link 9 passive joints is around twice the distance between the lower end of the lengthwise link 4 and the crosswise link 9. Thereby, the crosswise link 9 is arranged between the second lengthwise link 5 and the third lengthwise link 6. As can be seen from FIGS. 1 and 2, the lengthwise link 4 provided as metal structure comprises in side view a "L"-like shape between its ends such that the passive joints with the crosswise link 9 is backed-out in respect to a straight connection between the ends of the lengthwise link 4 in a direction away from the second lengthwise link 5 and the third lengthwise link 6.

Both the lengthwise bottom plate 8 and the crosswise bottom plate 10 are slidably arranged on a roof of the electrical vehicle 1. Therefore, two parallel rails 11 are provided on the roof of the electrical vehicle 1 which extend in crosswise direction of the electrical vehicle 1, as can be seen in FIG. 3. The lengthwise bottom plate 8 and the crosswise bottom plate 10 each comprise rollers, which slide on the rails 11. The lengthwise bottom plate 8 and the crosswise bottom plate 10 can be slid in crosswise directions by means of a pneumatic cylinder and/or an electrical motor 12 connected to each of the lengthwise bottom plate 8 and the crosswise bottom plate 10.

For electrically connecting the electrical vehicle 1 with the charging station 3, for charging not depicted batteries of the electrical vehicle 1, an electrical connector element 13, depicted in FIG. 2 as further perspective schematic view of the embodiment shown in FIG. 1, is attached to the upper end of the lengthwise link 4 on the lengthwise head plate 7. The charging station 3, as depicted in FIG. 3 in a side view, is arranged on a road at a passenger bus-stop for so called flash-charging the electrical vehicle 1 with electrical energy. In side view the charging station 3 comprises a C-like shape, having a vertically extending structure with a horizontally charging mount attached thereto, under which the electrical bus stops for charging with electrical energy.

Further referring to FIG. 3, the electrical vehicle 1 stops underneath the charging station 3. In the left drawing, the energy transfer device 2 is in a distracted position, whereby all before described elements are as closed as possible to the roof of the electrical vehicle 1. Such position is achieved by sliding the lengthwise bottom plate 8 and the crosswise bottom plate 10 at most away from each other so that the lengthwise top plate 7 is moved towards the roof. Once the electrical vehicle 1 has stopped underneath the charging station 3, the lengthwise bottom plate 8 and the crosswise bottom plate 10 are slid towards each other. The sliding leads the lengthwise top plate 7 to move away upwards and thus away from the roof. Such way the electrical connector element 13 arranged on the lengthwise top plate 7 is moved towards a charging station connector element 14 of the charging station 3, see middle drawing. In the right drawing the electrical connector element 13 is plugged into and thus connected with the charging station connector element 14 such that the electrical vehicle 1 can be charged with electrical energy.

As in the middle drawing of FIG. 3 the electrical connector element 13 reached a position just underneath the charging station connector element 14. Thus, in order to retain this horizontal position in respect to the charging station connector element 14 both the lengthwise bottom plate 8 and the crosswise bottom plate 10 are moved towards the right direction in the drawing. Generally, for moving up and down the electrical connector element 13 from the distracted position shown in the left drawing into the extracted position shown in the right drawing it could be sufficient to slide only one of the lengthwise bottom plate 8 and the crosswise bottom plate 10. However, depending on the position of the electrical connector element 13 in respect to the charging station connector element 14 first a movement of both the lengthwise bottom plate 8 and the crosswise bottom plate 10 in the same direction might be necessary for crosswise dislocating the electrical connector element 13 followed by a movement of both the lengthwise bottom plate 8 and the crosswise bottom plate 10 towards each other. A camera or the liked might be attached to the lengthwise top plate 7 for facilitating the positioning of the electrical connector element 13 in respect to the charging station connector element 14. For aligning the electrical connector element 13 in regard to a vertical axis, the electrical connector element 13 is attached to the lengthwise top plate 7 via a joint 15.

FIG. 4 the energy transfer device according to the further preferred embodiment. Compared to the energy transfer device depicted in FIG. 2, the energy transfer device of FIG. 4 the lengthwise link 4 consists of metal rods, whereby, in side view, each three metal rods form an equilateral triangle between the lengthwise top plate 7 and the lengthwise bottom plate 8 arranged at opposite edges of the triangle. The crosswise link 9 is connected the remaining edge of the triangle. The second lengthwise link 5 is provided in form of a y-structure with one end attached to the lengthwise top plate 7 and two ends attached to the lengthwise bottom plate 8. Further, the rails 11 and the electrical motors 12 are depicted in greater detail. As can be seen, two electric motors 12 and deflection rollers with belts 16 in form of a belt drive are depicted. The lengthwise bottom plate 8 and the crosswise bottom plate 10 are attached to the belts 16 so that when the belts move the lengthwise bottom plate 8 and the crosswise bottom plate 10 are respectively moved as well. Instead of a belt drive a worn drive could be used.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. An energy transfer device configured for electrically connecting an electrical vehicle to a charging station, the energy transfer device comprising:
   a lengthwise link having an upper end and lower end; and
   a crosswise link having an upper end and lower end;
   wherein the lower end of the lengthwise link and the lower end of the crosswise link are configured to be arranged on the electrical vehicle slidably in crosswise direction of the electrical vehicle; and
   wherein the upper end of the crosswise link is connected to the lengthwise link between its upper and lower ends such that by sliding the lower end of the lengthwise link and the lower end of the crosswise link toward each other, the upper end of the lengthwise link will be moved away from the electrical vehicle.

2. The energy transfer device according to claim 1, further comprising a second lengthwise link arranged in parallel and distant to the lengthwise link.

3. The energy transfer device according to claim 2, further comprising a third lengthwise link arranged in parallel and distant to the lengthwise link and to the second lengthwise link, wherein the crosswise link is arranged between the second lengthwise link and the third lengthwise link.

4. The energy transfer device according to claim 1, further comprising:
   a lengthwise top plate attached to the upper end of the lengthwise link;
   a lengthwise bottom plate attached to the lower end of the lengthwise link and slidably arranged on the electrical vehicle; and
   a crosswise bottom plate attached to the lower end of the crosswise link and slidably arranged on the electrical vehicle.

5. The energy transfer device according to claim 4, wherein the lengthwise top plate is attached to the upper end of the lengthwise link and wherein the upper end of the crosswise link is attached to the lengthwise link by a passive joint.

6. The energy transfer device according to claim 4, further comprising a pneumatic cylinder and/or an electrical motor coupled to the lengthwise bottom plate and the crosswise bottom plate.

7. The energy transfer device according to claim 1, wherein the upper end of the crosswise link is attached to the lengthwise link by a passive joint.

8. The energy transfer device according to claim 1, further comprising an electrical connector element attached to the upper end of the lengthwise link and configured to electrically connect to the charging station.

9. The energy transfer device according to claim 8, wherein the electrical connector element is attached to the upper end of the lengthwise link via a joint that allows rotation of the electrical connector element around a vertical axis.

10. An electrical vehicle comprising:
    a vehicle body that includes a roof;
    a plurality of rails coupled to the roof;
    a lengthwise bottom plate slidably attached to the rails;
    a crosswise bottom plate slidably attached to the rails;
    a lengthwise link having an upper end and lower end, the lengthwise bottom plate being attached to the lower end of the lengthwise link;
    a crosswise link having an upper end and lower end, the crosswise bottom plate being attached to the lower end of the crosswise link, wherein the upper end of the crosswise link is connected to the lengthwise link between its upper and lower ends such that by sliding the lower end of the lengthwise link and the lower end of the crosswise link toward each other, the upper end of the lengthwise link will be moved away from the roof; and
    an electrical connector element attached to the upper end of the lengthwise link.

11. The electrical vehicle according to claim 10, wherein the electrical vehicle is an electrical bus.

12. The electrical vehicle according to claim 10, wherein the lengthwise bottom plate and the crosswise bottom plate are arranged on the rails mounted in a crosswise direction of the electrical vehicle.

13. The electrical vehicle according to claim 10, further comprising a second lengthwise link arranged in parallel and distant to the lengthwise link.

14. The electrical vehicle according to claim 10, further comprising a lengthwise top plate attached to the upper end of the lengthwise link.

15. The electrical vehicle according to claim 10, wherein the upper end of the crosswise link is attached to the lengthwise link by a passive joint.

16. The electrical vehicle according to claim 10, wherein the electrical connector element is attached to the upper end of the lengthwise link via a joint that allows rotation of the electrical connector element around a vertical axis.

17. A method for connecting an energy transfer device to a charging station, the energy transfer device comprising a lengthwise link having a lower end slidably attached to an electrical vehicle and a crosswise link having a lower end slidably attached to the electrical vehicle and an upper end crosswise link is connected to the lengthwise link between the lower end and an upper end, the method comprising:
    sliding the lower end of the lengthwise link and the lower end of the crosswise link toward each other such that the upper end of the lengthwise link is moved away from the electrical vehicle; and
    connecting an electrical connector element arranged at the upper end of the lengthwise link to the charging station.

18. The method according to claim 17, further comprising aligning the electrical connector element with the charging station prior to connecting.

19. The method according to claim 18, wherein the aligning comprises sliding the lower end of the lengthwise link and the lower end of the crosswise link in the same direction such that the lengthwise link and the crosswise link are moved in crosswise direction of the electrical vehicle.

20. The method according to claim 18, wherein the aligning comprises rotating the electrical connector element around a vertical axis.

* * * * *